(12) United States Patent
Krause

(10) Patent No.: US 6,467,980 B1
(45) Date of Patent: Oct. 22, 2002

(54) APPARATUS FOR CLEANING OPTICAL FIBER ENDFACES

(75) Inventor: Dennis Krause, Atkinson, NH (US)

(73) Assignee: Lucent Technologies ( * ) Notice: Subject to any disclaimer, the term of this patent is extended or adjusted under 35 U.S.C. 154(b) by 0 days.

(21) Appl. No.: 09/478,227

(22) Filed: Jan. 6, 2000

(51) Int. Cl.[7] ................................................ B43K 5/00
(52) U.S. Cl. ........................ 401/198; 401/202; 401/262
(58) Field of Search ................................ 401/145, 198, 401/202, 187, 188, 262, 264, 261

(56) References Cited

U.S. PATENT DOCUMENTS 2,853,727 A * 9/1958 Nadai ........................ 401/198
2,975,464 A * 3/1961 Schultz ........................ 401/198
4,133,614 A * 1/1979 Baginski et al. ............. 401/198

* cited by examiner

Primary Examiner—David J. Walczak

(57) ABSTRACT

An optical fiber cleaner includes a base having a well supported within an annular section. An absorbent material, such as a sponge or cotton ball, may be located within the well of the base. A cover mates with the base and holds a wipe in a preferred position over the well. The cover includes an aperture through which the wipe may be accessed. The cover may also include a hinged element, or lid, that closes over the aperture within the cover when the cleaner is not in use. The base may itself be an element of the lid of a push-pump mechanism. In such case, the well within the base is operationally connected to receive solvents from the pumping mechanism and the pumping mechanism, including the base, forms a cover for a solvent reservoir, such as a non-reactive bottle.

4 Claims, 2 Drawing Sheets

APPARATUS FOR CLEANING OPTICAL FIBER ENDFACES

FIELD OF THE INVENTION

The invention relates to the cleaning of optical fibers and, in particular, to the safe application of solvents to and removal of contaminants from the endfaces of optical fibers.

BACKGROUND OF THE INVENTION

Optical transmission of signals is not new. Mirrors have been used for centuries to reflect light in signaling patterns. Lanterns hung in the bell tower of the Old North Church in Boston's North End were employed by Paul Revere to indicate the route used by the British in their advance on Concord. Alexander Graham Bell transmitted a telephone signal using sunlight as a carrier more than one hundred years ago. However, using optical signals to transmit high-speed telecommunications has only been practical for the past few decades and one of the innovations that made such transmissions practical is the optical fiber.

Coupled with a "single frequency" laser a single mode fiber may be capable of reliably supporting data rates in excess of Terabits/sec. Great pains must be taken to insure reliable operation at such high data rates. A great deal of information could be lost in a short period of time at such high transmission rates. Various optical components within a telecommunication system are linked through the use of optical connectors and the interface at each of these connections poses the danger of signal loss. That is, contaminants in the form of organic films or solid contaminants may be inadvertently introduced to the endfaces of optical connectors and these contaminants may reflect or absorb optical signals intended for transmission through the endface. Optical signal levels may be significantly reduced even by contaminants of a microscopic scale and the diminished signals could cause significantly increased bit error rates for optical transmissions that pass through a contaminated connector. Consequently, fiber endfaces are typically cleaned to exacting standards before they are shipped to an installation site.

This cleaning process typically requires a technician to apply a solvent to a connector endface, and wipe the endface with a nonabrasive material, such as a soft cloth sometimes referred to as a "swipe". Direct contact with the solvent may pose a health hazard; therefore, technicians typically don gloves to avoid direct contact with the solvent materials. Unfortunately, the gloves sometimes prove awkward and reduce the efficiency of technicians engaged in the cleaning process. Additionally, there is some indication that some technicians may develop an allergy to glove materials, such as latex.

It would therefore be highly desirable to provide an apparatus that enables the fast, efficient, and safe cleaning of optical fiber endfaces.

SUMMARY

An optical fiber cleaning apparatus in accordance with the principles of the present invention includes a base that includes a well supported within an annulus. The well may be formed as a concave paraboloid and acts as a local reservoir for solvent fluids. An absorbent material, such as a sponge or cotton ball, may be located within the well of the base. A cover mates with the base and holds a cleaning fabric in a preferred position over the well. The cover includes an aperture through which the cleaning fabric may be accessed. The cover may also include a hinged element that closes over the aperture within the cover when the cleaning apparatus is not in use.

In accordance with the principles of the present invention the base may itself be an element of the lid of a push-pump mechanism. In such an embodiment the well within the base is operationally connected to receive solvents from the pumping mechanism. The pumping mechanism, including the base, forms a cover for a solvent reservoir, such as a non-reactive bottle.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

Figure 1:
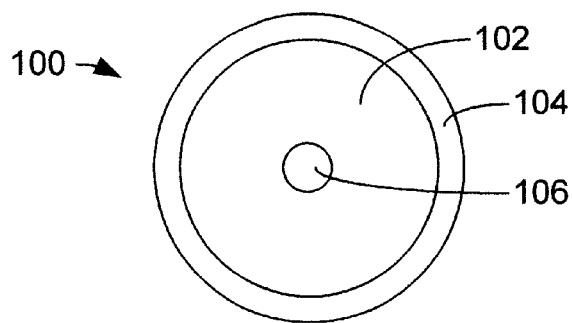
FIG. 1 is a top plan view of an optical fiber cleaning system's base in accordance with the principles of the present invention.

The base portion of an optical fiber cleaning mechanism in accordance with the principles of the present invention is illustrated in the top plan view of FIG. 1. The base 100 is formed of a well 102 supported by an annular section 104. The well 102 and annular section 104 may be formed of a metallic substance and formed in a single unit by extrusion, for example. The well 102 is illustrated as a concave paraboloid due to the simplicity of extruding such a shape, but other shapes are contemplated within the scope of the invention. The well 102 acts as a local reservoir for solvent materials. An absorber 106 formed of a disc of absorbent material, such as a sponge or cotton ball, may be located within the well 102 of the base. The absorber 106 operates to steady the flow of solvent material to a cleaning fabric that is placed over and held in contact with the absorber 106.

Figure 2:
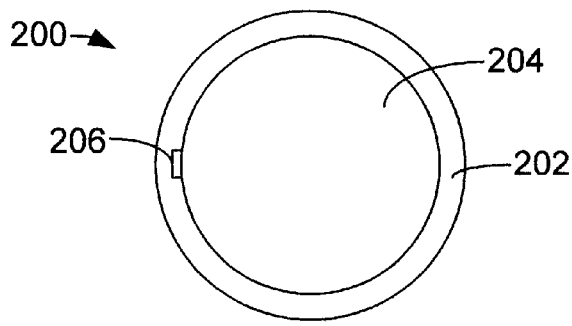
FIG. 2 is a top plan view of an optical fiber cleaning system lid that is designed to cover the base of FIG. 1.

The top plan view of FIG. 2 illustrates a cover 200 that operates in mating relation with the base of FIG. 1. The cover 200 includes an annular section 202 that is sized to fit over the base 100 in such a manner as to hold a "wipe", such as a swatch of cleaning fabric, in place while stretching the fabric over the well 102. In this illustrative embodiment, the cover 200 also includes a lid 204 that is attached via a hinge 206 to the annular section 202. When closed, the lid 204 overlaps the annular section 202 a sufficient amount to substantially reduce the emanation of fumes from solvent located within the well 102.

Figure 3:
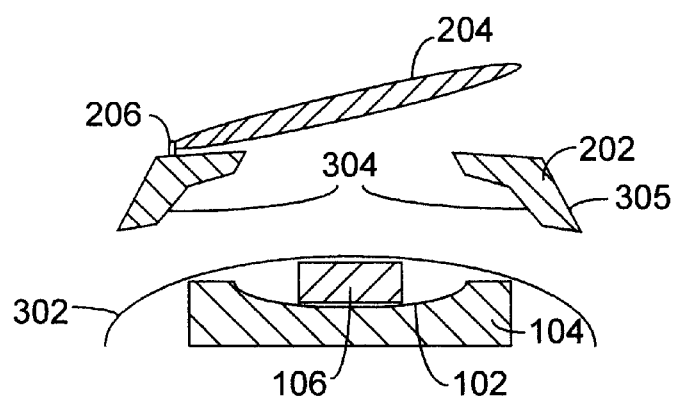
FIG. 3 is a sectional view including the cleaning mechanism base, an absorbent material located within the base, and a cleaning fabric held in place by the lid of FIG. 2.

The sectional view of FIG. 3 illustrates a combination of the base 100 and cover 200 of FIGS. 1 and 2, respectively. In operation the cover 200 is placed over the base 100 and holds a wipe 302 in place over the well 102. The cover 200 includes an the annular section 202 that supports the lid, the annular section 202 including inside 304 and outside 305 diameters. The inside diameter 304 being tapered to stretch and hold the wipe 302 in place when placed over a wipe in contact with the annular support section of the base. The inner diameter 304 of the cover annular section 202 may be tapered in order to insure a friction fit of the wipe 302 between the cover 200 and the outside diameter of the base 100. With the absorber 106 located within the well 102 of the base 100 the wipe 302 may be stretched until it is relatively taut over the well 102 and in contact with the aborber 106. In this manner the absorber 106 may provide a steady flow of solvent material from the well 102 to the wipe 302. In an illustrative embodiment, the annular section 202 of the cover may be formed of a material such as Pomalux SD (available from Westlake Plastics, Lenni, Pa.) and the base 100 may be composed of a non-reactive metal. The wipe 302 is preferably a lint-free, non-abrasive fabric. In an illustrative embodiment the wipe is composed of an ultra-fine weave that includes on the order of 220,000 micro-fibers per square inch is. A material such, Luminex, which is available from Toray Marketing Inc. of New York, N.Y. is an example of such a material.

Figure 4:
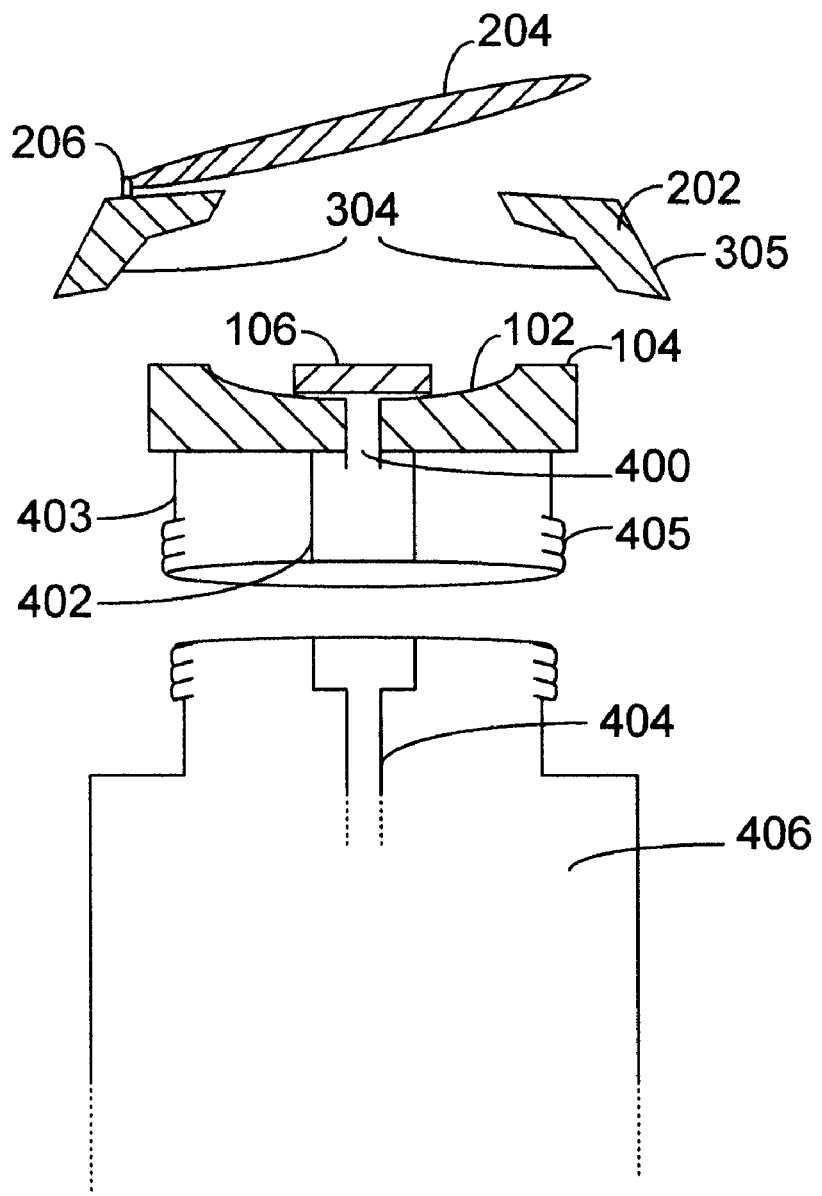
FIG. 4 is a sectional view of an optical fiber cleaning system, including the base of FIG. 1 and the lid of FIG. 2, in accordance with the principles of the present invention.

In an illustrative embodiment the base 100 may be combined with a pump bottle lid, as illustrated in the sectional view of FIG. 4. In such a combination the well 102 includes an aperture 400 in operative communication with a pump 402. The pump 402 is connected to a bottle lid 403 that employs threads 405 to screw onto a bottle 406 in which solvent may be stored. A tube 404 provides access to the contents of the bottle 406. When the base 100 is depressed (by pushing on the cover 200 for example), the pump 402 operates to supply solvent from the bottle 406 to the well 102. That is, the pump 402 and lid 403 combine to form a push-pump lid mechanism with the base 100 forming an activating member of the push-push lid and a bottle lid 403 forming another activating member of the pushpump lid such that pushing the base 100 and bot and allowing them to return to a resting position operates a mechanical pump to communicate fluid through the pump 402 to the mell 102 of the base 100. In operation wipe 302 is placed over the base 100 and the cover 200 is pressed over the wipe 302 and base 100. The tapered inside diameter of the cover's annular section 202 engages with the wipe 302 and stretches it tightly and securely in place over the well 102 and absorber 106. With the cover lid 204 open an aperture in the cover provides access to the wipe 302 for cleaning optical fiber endfaces.

When the dispenser (comprising base 100, pump 402, and bottle 406) is pumped, solvent enters the well 102 and saturates the wipe 302. The absorber 106 maintains contact between the solvent and the wipe and provides soft support during the cleaning operation. The optical fiber endface to be cleaned, which may be contained within a connector, for example, may be moved in a figure-eight motion perpendicular to the surface of the wipe, thus dissolving and scrubbing contaminants into the weave of the wipe's fabric. The wipe 302 may be a reusable material and, as described, is maintained under tension over the base 100 by the cover 202. The solvent may be any of a variety of commercially available solvents, such as ethyl or 99% electronic grade isopropyl alcohol. A technician using the new optical fiber cleaning apparatus need not have any direct contact with the cleaning solvent nor need they wear gloves to prevent such contact.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. An optical fiber endface cleaner comprising:
   a base section having a well capable of holding a solvent material;
   a cover having an aperture, the cover designed for mating connection with the base such that the cover holds a wipe in place between the cover and base with the wipe accessible through the aperture in the cover and with the wipe available to receive solvent from the well; an absorber located within the well of the base wherein the absorber is positioned to provide fluid contact between the wipe and the solvent within the well; and a hinged lid that rests atop the cover and substantially reduces the escape of vapors from solvent in the well when the cleaner is not in use wherein the cover includes an annular section that supports the lid, the annular section including an inside diameter, the inside diameter being tapered to stretch and hold the wipe in place when the cover is placed over the wipe and in contact with an annular section of the base.

2. The cleaner of claim 1 wherein the annular section of the base supports a concave well section.

3. The cleaner of claim 2 wherein the concave well section is substantially paraboloid.

4. The cleaner of claim 1 wherein the wipe is composed of a lint-free, non-abrasive, finely woven material of more than 100,000 fibers per square inch.

* * * * *